United States Patent
Cochran et al.

(10) Patent No.: US 7,360,044 B2
(45) Date of Patent: Apr. 15, 2008

(54) STORAGE SYSTEM WITH PRIMARY MIRROR SHADOW

(75) Inventors: Robert Cochran, Sacramento, CA (US); Titus E. Davis, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/896,100

(22) Filed: Jul. 20, 2004

(65) Prior Publication Data

US 2006/0020753 A1 Jan. 26, 2006

(51) Int. Cl.
*G06F 12/16* (2006.01)

(52) U.S. Cl. ............. 711/161; 711/114; 711/162
(58) Field of Classification Search ............ None
See application file for complete search history.

(56) References Cited

U.S. PATENT DOCUMENTS

| | | | |
|---|---|---|---|
| 5,870,537 A * | 2/1999 | Kern et al. | 714/6 |
| 6,493,729 B2 | 12/2002 | Gusler et al. | |
| 6,502,162 B2 | 12/2002 | Blumenau et al. | |
| 6,502,205 B1 | 12/2002 | Yanai et al. | |
| 6,694,413 B1 | 2/2004 | Mimatsu | |
| 6,925,541 B2 | 8/2005 | Yamagami | |
| 6,972,557 B2 * | 12/2005 | Park | 324/158.1 |
| 6,996,672 B2 * | 2/2006 | Lubbers et al. | 711/114 |
| 7,117,249 B1 | 10/2006 | Kitamura | |
| 7,155,486 B2 * | 12/2006 | Aoshima et al. | 709/211 |
| 7,216,210 B2 * | 5/2007 | Tomita | 711/162 |
| 2004/0107315 A1 * | 6/2004 | Watanabe et al. | 711/114 |

\* cited by examiner

*Primary Examiner*—T Nguyen (57) ABSTRACT

A storage system with primary mirror shadow comprises a storage array, and a controller. The controller is capable of predefining storage array volumes as a primary volume that is subsequently paired with a secondary volume, emulating a primary logical device and a plurality of secondary logical devices including a shadow logical device, tracking volumes and logical devices using a pointer, and instantaneously evoking a volume copy by a pointer exchange.

24 Claims, 7 Drawing Sheets

STORAGE SYSTEM WITH PRIMARY MIRROR SHADOW

BACKGROUND OF THE INVENTION

Network storage arrays can use redundant data copies to ensure data availability. For example, one storage system configuration uses multiple disks to store data. An application host creates new data that is written on a primary mirror disk. A disk controller responds to writes to the primary disk by updating the data changes to a secondary disk automatically. The secondary disk has read-only access from a backup and data mining host system, unless suspended. The mirrored pair has multiple states including an initial creation copy state with full out-of-order copying, a pair state with updated data sent, perhaps out-of-order, a suspended state with consistent and usable but stale data, and a resynchronize state in which data is inconsistent with out-of-order copying. Secondary data is only usable, consistent, and writeable during the suspended state.

With existing high-end disk array internal volume copy products, the time duration to transfer all primary volume data to reside on the secondary volume can be very long. At typical internal copy speeds of forty to eighty Megabytes per second, user volumes with a size in the range from hundreds to thousands of gigabytes can last several minutes. During the interim, substantial data loss can occur in the event of a disaster or catastrophe brought on by disturbances as common as a power loss or outage. Users are highly sensitive to the vulnerability inherent in the long copy times that exposes even the primary data to potential loss until the copy completes.

The highly vulnerable copy operation can be a common occurrence for purposes including data warehouse applications, data backup, application testing, and the like so that the loss potential is a frequent worry of users.

Virtual copy techniques exist that simulate or feign completion of the operation before the data has actually transferred. Such techniques utilize frantic out-of-order background copying if the user actually requests the data from the secondary volume. The known techniques have imperfections in that while the secondary volume reader is given the illusion of full data availability, failure of the primary volume prior to completion of a full copy leaves the secondary volume reader with inconsistent and unusable data.

SUMMARY

An illustrative embodiment of a storage system enables usage of a primary mirror shadow. The system predefines storage array volumes as a primary volume that is subsequently paired with a secondary volume and emulates a primary logical device and a plurality of secondary logical devices, enabling instantaneously evocation of a volume copy.

BRIEF DESCRIPTION OF THE DRAWINGS

Embodiments of the invention relating to both structure and method of operation, may best be understood by referring to the following description and accompanying drawings.

DETAILED DESCRIPTION

What is desired is a system and method that facilitates data availability at all times.

According to some embodiments, a storage system with a primary mirror shadow comprises a storage array, and a controller. The controller is capable of predefining storage array volumes as a primary volume that is subsequently paired with a secondary volume, emulating a primary logical device and a plurality of secondary logical devices including a shadow logical device, tracking volumes and logical devices using a pointer, and instantaneously evoking a volume copy by a pointer exchange. In the emulation operation, a storage array volume is defined in advance for subsequent usage as an internal copy primary volume, which is eventually paired with a secondary volume. Typically, the emulation involves configuration of the storage volume as a particular storage type, for example a particular RAID type. The emulation enables volumes designated for eventual usage as internal copy primary volumes to possess a silent shadow logical device (ldev) that is transparent to the emulation so that when a copy to a secondary volume is eventually requested, the shadow ldev is made the new secondary volume by way of an instantaneous LUN/ldev pointer swap for accelerated completion.

In other embodiments, a storage system with primary mirror shadow comprises a storage array and a controller. The controller is capable of reserving a pool of logical devices for usage as a secondary volume for subsequent pairing to a predefined primary volume, mapping logical units, associating logical devices and logical units using a pointer, and instantaneously evoking a volume copy via a pointer exchange.

According to further embodiments, a method of managing a storage array with primary mirror shadow comprises defining storage array volumes prior to usage as a primary volume for subsequently pairing with a secondary volume, and emulating a primary logical device and a plurality of secondary logical devices including a shadow logical device. The method further comprises associating volumes and logical devices and instantaneously evoking a volume copy by exchanging the association of volumes and logical devices.

In still other embodiments, a method of managing a storage array with primary mirror shadow comprises reserving a pool of logical devices for usage as a secondary volume for subsequent pairing to a predefined primary volume, and mapping a plurality of logical units. The method further comprises associating logical devices to logical units; and instantaneously evoking a volume copy via exchanging the association of logical devices to logical units.

Figure 1:
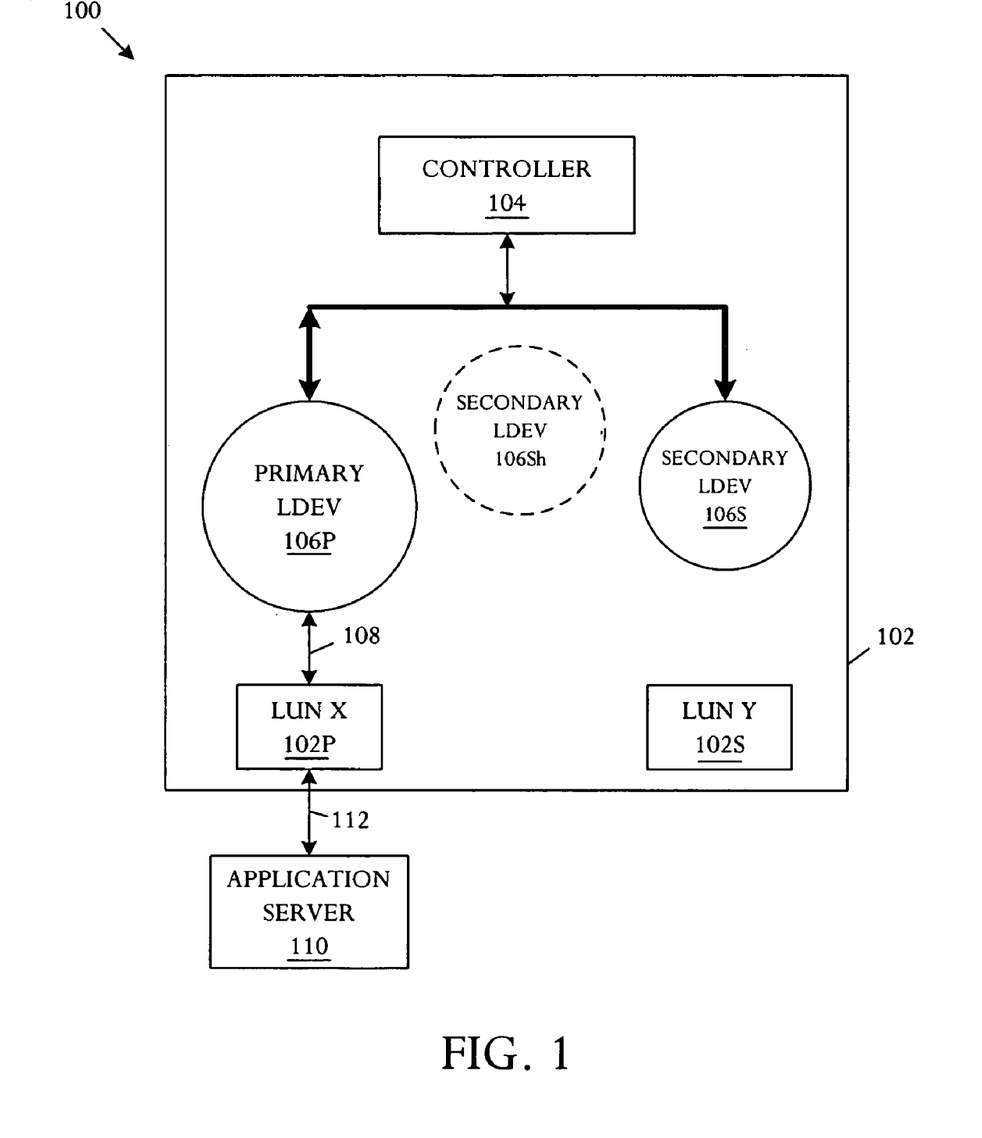
FIG. 1 is a schematic block diagram that depicts an embodiment of a storage system that utilizes a primary mirror shadowing method.

Referring to FIG. 1, a schematic block diagram depicts an embodiment of a storage system 100 that utilizes a primary mirror shadowing method. The primary mirror shadowing method enables faster and more efficient internal storage array pair creation. The storage system 100 includes a storage array 102, and a controller 104. The controller 104 is capable of predefining storage array logical volumes as a primary volume 102P that is subsequently paired with a secondary volume 102S. The controller 104 emulates a primary logical device 106P and a plurality of secondary logical devices 106S including a shadow logical device l06Sh. The controller 104 maps the host viewable logical volumes 102 and logical devices 106 using a pointer 108, and can instantaneously evoke a volume copy by exchanging pointers. A logical device 106 is a storage array represented as a single logical storage device, although often being a composition of multiple disks or multiple partial disks.

In the illustrative system, the storage volumes 102 are designated as logical units (LUN) for association with logical devices (LDEV) 106. In a specific example using a Small Computer Systems Interface (SCSI) or similar standard, a LUN can result from mapping a logical unit number (LUN), port identifier (ID), and LDEV ID to a Redundant Array of Inexpensive Disks (RAID) group. LUN size is determined by the emulation mode of the LDEV and the number of LDEVs associated with a LUN. A logical device (LDEV) is created with a RAID group divided into portions according to a selected host emulation mode. In the description, the term LUN is used synonymously with the term volume.

A user can define, in advance, a particular storage array volume for usage as an internal copy primary volume and also define a secondary volume to which the primary volume is to be paired. A host system can be connected via a logical host connection 112 to the storage system 100 to enable the user to designate the storage volume arrangements. Data is transferred from a device, such as an application server 110, to the primary volume 102P and stored on the primary logical device 106P. The storage system 100 controls mirroring of data on the primary volume 102P to the secondary volume 102S.

In an illustrative embodiment, the storage array 102, for example a disk array of a Redundant Array of Inexpensive Disk (RAID) type of the multiple RAID types, can be defined prior to usage as an internal copy primary volume 102P that is eventually paired with a secondary volume 102S, typically also of the pre-determined RAID type.

The volumes designated for eventual utility as internal copy primary volumes 102P are allocated a silent shadow logical device (LDEV) 106Sh for usage when a copy to a secondary volume 102S is eventually requested. In response to a request of a copy, for example a full copy, from the primary volume 102P to the secondary logical volume 102S, a controller 104, for example the disk controller, defines the shadow logical device 106Sh to operate as the new secondary volume 102S using an instantaneous exchange of pointers. The pointer exchange enables accelerated, instantaneous completion of the copy in comparison to conventional copy techniques.

Completion of a full copy is defined in the context of the illustrative storage system 100 as the transfer of primary data to fully reside on the secondary volume. In comparison, typical conventional copy-volume techniques initially feign completion of copy with possibly only a portion or none of the transfer actually complete and, if a user actually requires the data, begins frantic out-of-order copying.

In various embodiments or conditions, a silent shadow logical disk device 106Sh may use available disks from various sources, generally of a proper RAID type. One disk source is a pool of logical devices allocated for eventual usage as internal copy secondary volumes. The disks may otherwise be allocated from a pool of generic logical devices awaiting assignment to a port path to enable detection by a host. The disks can also be accessed from logical devices created from a pool of "hot spare" physical disks. A hot spare is used to automatically recover data when a physical disk fails and is effective only for data on a mirrored volume if one of the two disks from the mirrored volume fails and a hot spare is present in the same disk group. Information from the failed disk is automatically placed on the hot spare.

The illustrative storage system is a disk storage system, such as a magnetic disk system. In other embodiments, other types of storage, such as tape storage, may be used. In various embodiments, the storage arrays may be internal to a particular storage device, cabinet, or storage center. In other embodiments, the storage arrays may be distributed over one or more devices, cabinets, or storage centers including geographically remote or diverse sites.

The storage system 100 implements a primary mirror shadowing functionality by coordinated operations between the storage array 102 and the controller 104. The controller 104 can reserve a pool of logical devices 106S for usage as a secondary volume 102S for subsequent pairing to a predefined primary volume 102P. The controller 104 maps the logical units, associates logical devices and logical units using a pointer 108, and instantaneously evoking a volume copy via a pointer exchange.

One or more secondary volumes 102S can be defined for subsequent usage as an internal copy of the primary volume 102P. The controller 104 creates and emulates a shadow logical device 106Sh so that, in response to a request for a full copy of the primary volume to the secondary volume, the controller 104 instantaneously switches a volume and logical device pointer 108 to enable usage of the shadow logical device 106Sh as the secondary logical volume 102S.

Figure 2A:
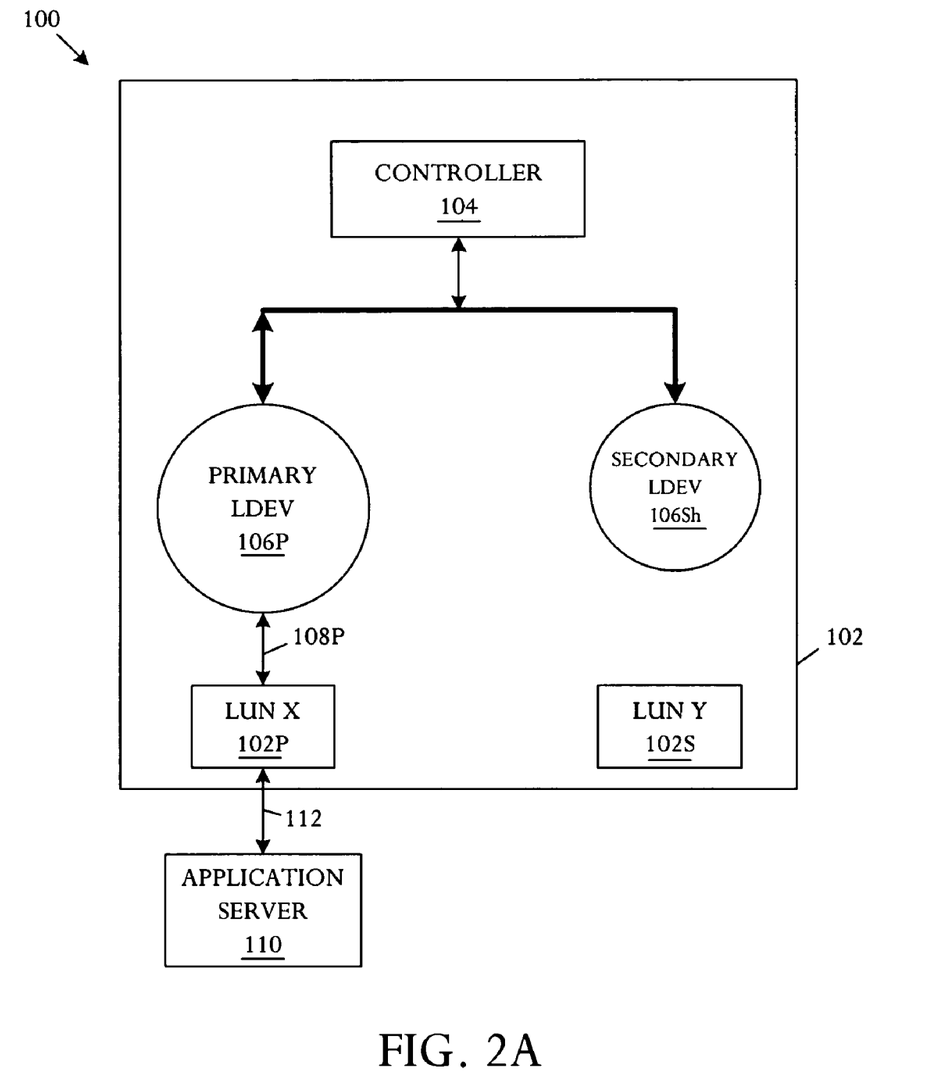
FIGS. 2A, 2B, and 2C are schematic block diagrams showing conditions of the storage system at different stages of the primary mirror shadowing method.

Referring to FIG. 2A, a schematic block diagram depicts an example of a condition, using the primary mirror shadowing method, prior to identification of a secondary volume. At the illustrative point in time, a user has already created a reserved pool of logical units (LUNs) but has not yet entered a command to create a pair. In a typical example, a user can create the reserved pool of logical units as a list of available LUNs via a graphical user interface (GUI). The GUI can display available storage devices on a display screen and the user can point and click on displayed storage element icons to assign a list of LUNs as available devices. The user can allocate LUNs from internally and externally accessible storage devices. A LUN can relate to a single logical device (LDEV), multiple LDEVs, aggregate LDEVs, or portions of a storage device or disk. The GUI can also generate a "pair create" command that enables pairing of primary and secondary volumes. In other embodiments, a command line interface (CLI) can be used to create the reserved pool.

At the illustrative point in time, a user has defined LUN X as the primary volume 102P in a pair that has not yet been established. A pointer 108P designates the association between LUN X as the primary volume 102P and the primary logical device 106P. LUN Y is not yet designated or identified as the prospective secondary volume LUN. Accordingly, no pointer associates LUN Y and a secondary logical device. A pairing request is not yet made. Although no pairing request is yet made, the controller 104 begins functionality automatically and selects a logical device, for example of the proper RAID type, and begins a full, track order copy of the primary volume. Once the pool of LUNs is defined, even before a request for mirroring is made, the storage system 100 begins to create the shadow mirror copy 106Sh.

Figure 2B:
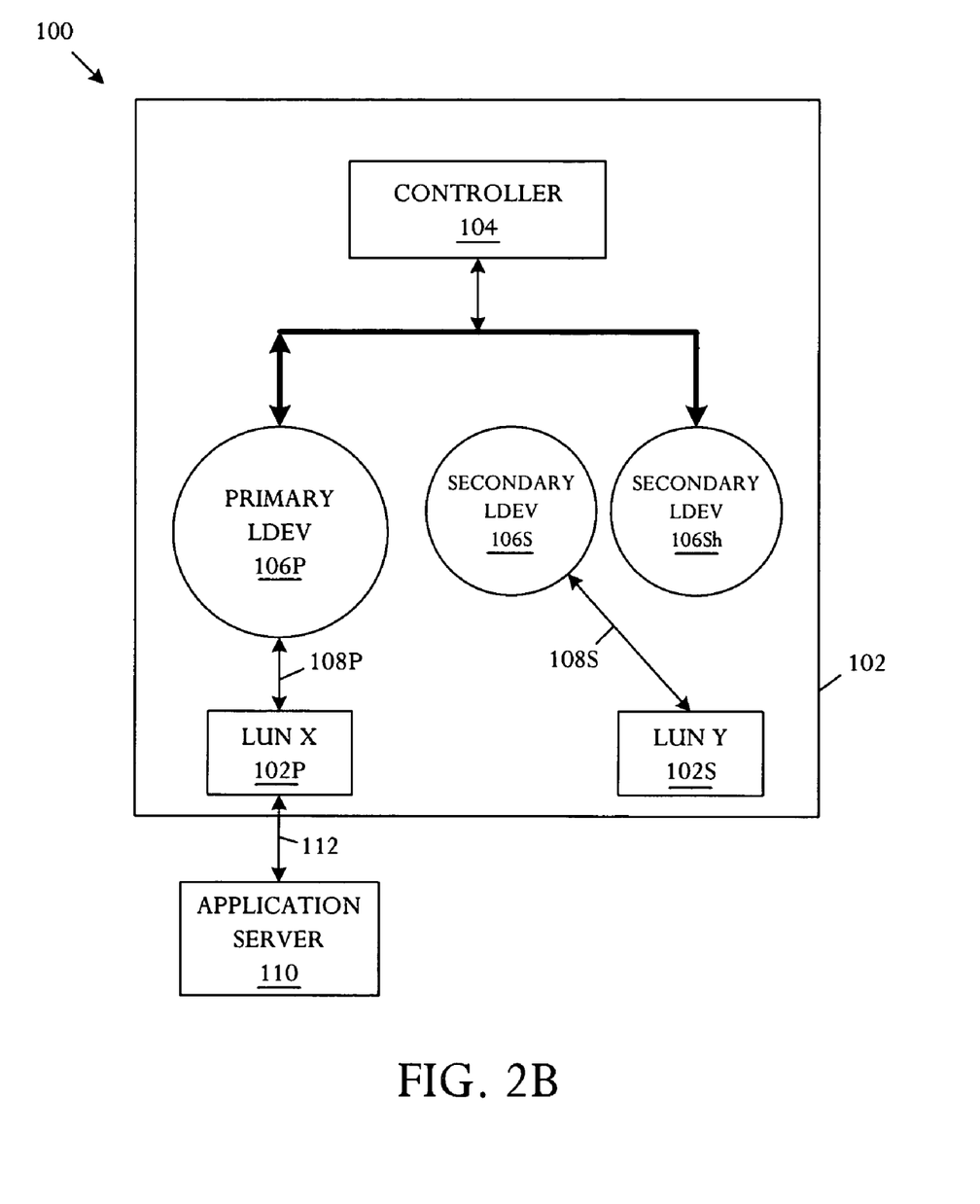

Referring to FIG. 2B, a schematic block diagram shows actions of the primary mirror shadowing system at definition of a secondary logical volume 102S, also prior to a pairing request. The secondary volume 102S is defined, for example using an interface such as the graphical user interface (GUI) or command line interface (CLI), to create linkages of secondary volumes (LUNs) 102S and secondary logical devices 106S, from previously unaffiliated logical devices and unassigned logical units. Definition of the secondary volume 102S creates a pointer 108S that assigns LUN Y as the secondary volume 102S and designates the linkage of the LUN Y to the secondary logical device (LDEV) 106S. Although the pointer 108S links LUN Y to logical device 106S, primary mirror shadowing functionality continues for writes of new data from the application server 112 to the primary volume 102P, and data continues to automatically copy to the shadow logical device 106Sh.

Figure 2C:
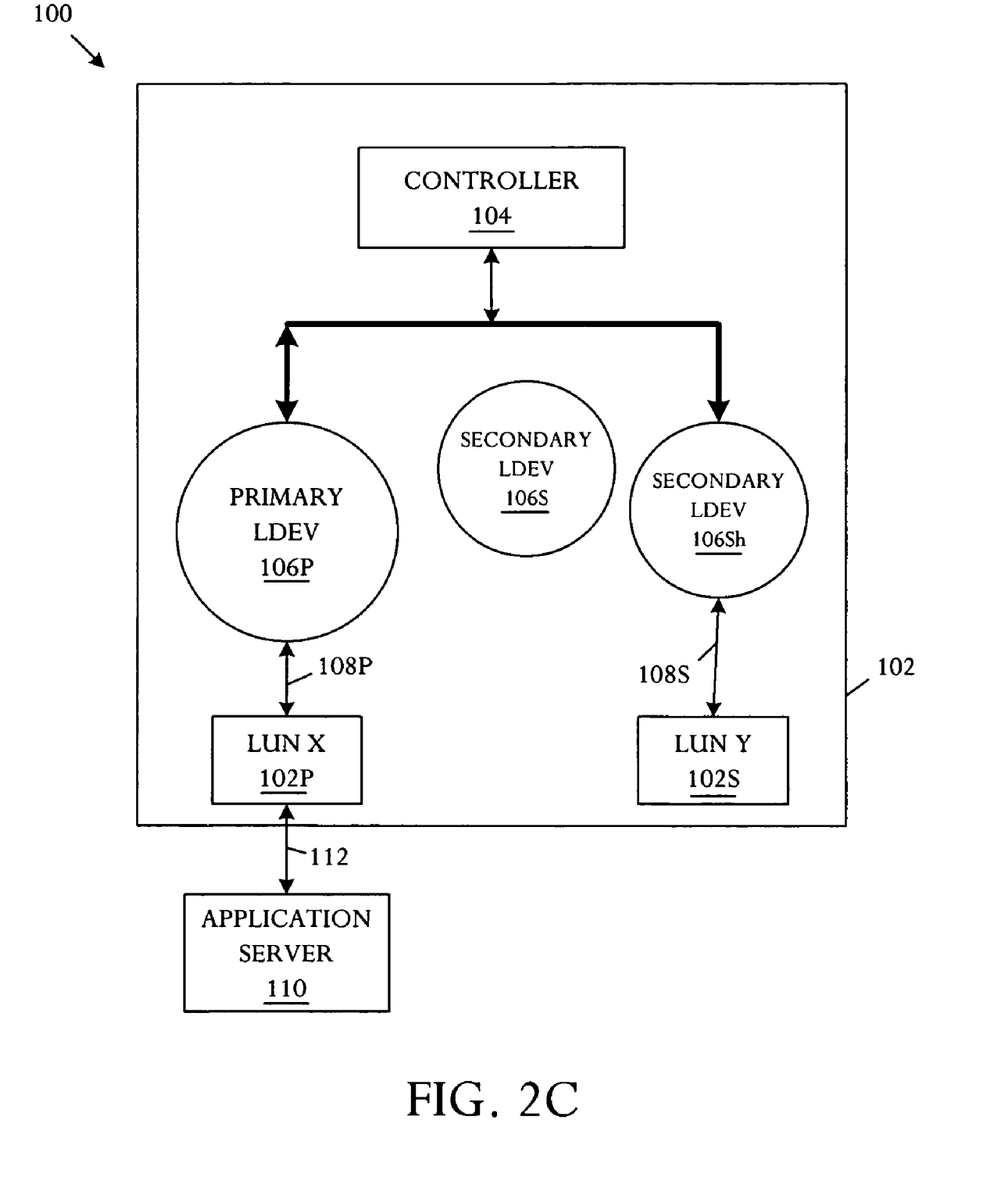

Referring to FIG. 2C, a schematic block diagram shows actions of the primary mirror shadowing system when a pairing request occurs, for example when a user issues a create-pair command. A user makes a pairing request to pair the primary volume 102P and the secondary volume 102S. In some conditions, no copy to the shadow logical device 106Sh is pending. Accordingly, any track-ordered copy to the shadow logical device 106Sh is complete. At the illustrative time, updates to the primary volume 102P are mirrored to the shadow logical device 106Sh on any update occurrence. The primary mirror shadowing functionality causes automatic switching of the LUN Y pointer 108S from the secondary logical device 106S to the shadow logical device 106Sh. The primary mirror shadowing system functionality also releases the secondary logical device 106S as available for other usage.

In other conditions, a copy to the shadow device 106Sh is pending and a pairing request occurs. During a write update to the shadow logical device 106Sh from the primary logical device 106P, a user makes a pairing request to pair the primary volume 102P and the secondary volume 102S. The primary mirror shadowing functionality automatically switches the LDEV-to-LUN pointer 108S from the secondary logical device 106S to the shadow logical device 106Sh so that the pair-create operation can be complete "sooner than otherwise". A full-or-nothing copy technique can be used and track copies are continued to attain completion sooner than otherwise would be available before a "complete" message is relayed to the user. A virtual-copy-complete technique can be used in which the primary mirror shadowing system claims "complete" to the user immediately and continues making background track copies, and out-of-order track copies, in a manner sufficient to complete the copy while supplying data to the user.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 3:
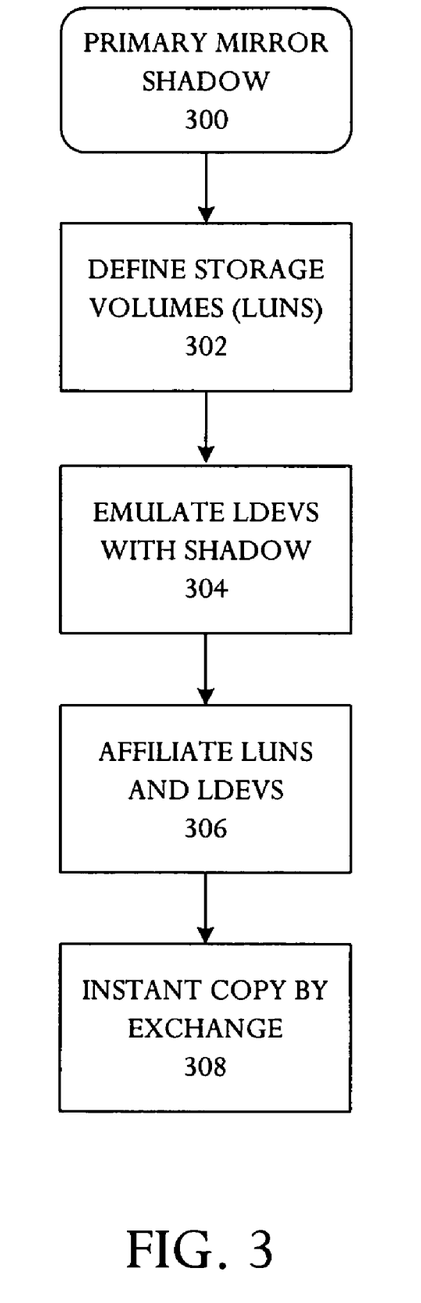
FIG. 3 is a flow chart illustrating an embodiment of a method of managing a storage array using primary mirror shadow functionality.

Referring to FIG. 3, a flow chart illustrates an embodiment of a method of managing a storage array 300 using primary mirror shadow functionality. Storage array volumes are defined 302 prior to usage as a primary volume for subsequently pairing with a secondary volume. The primary mirror shadowing system emulates a primary logical device and a plurality of secondary logical devices 304 including a shadow logical device. The primary mirror shadowing system establishes an association between volumes and logical devices 306. Upon a pair-create request, the primary mirror shadowing system instantaneously evokes a volume copy by exchanging the association of volumes and logical devices 308.

Figure 4:
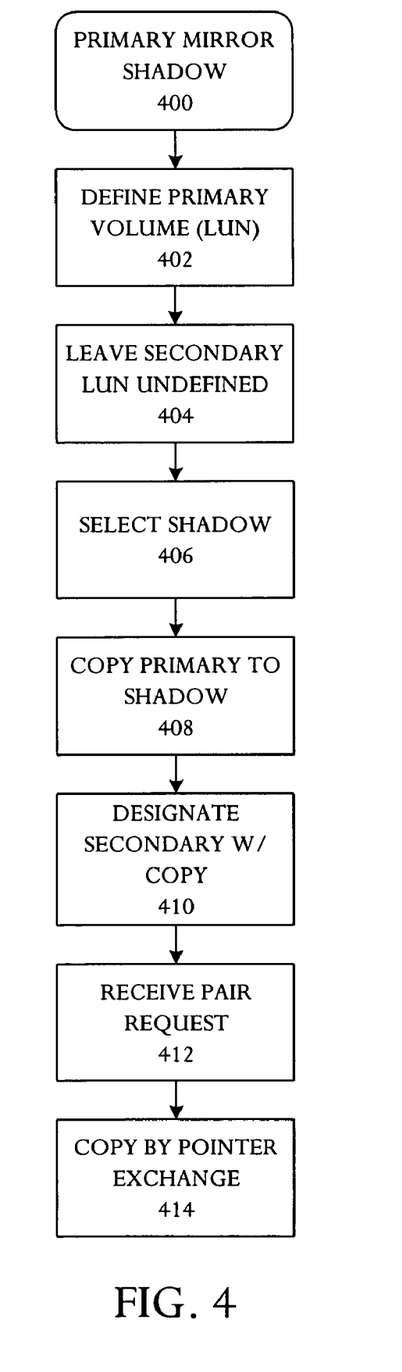
FIG. 4 is a schematic flow chart that illustrates an embodiment of another primary mirror shadowing system.

Referring to FIG. 4, a schematic flow chart illustrates an embodiment of another primary mirror shadowing system 400. The primary mirror shadowing system defines a first logical unit as a primary volume 402 in a pair to be subsequently established. The definition associates the first logical unit to a primary logical device. The system 400 leaves a second logical unit undesignated and unidentified 404 with respect to a secondary volume. The system 400 selects a logical device as a shadow device 406 and initiates copying of data 408 from the primary logical device to the shadow device.

The primary mirror shadowing system 400 designates a second logical unit as an eventual secondary volume 410 while continuing copying of the primary logical device to the shadow device. The designation associates the second logical unit to a secondary logical device.

The primary mirror shadowing system 400 receives a request for pairing the primary volume and the secondary volume 412. If a track ordered copy from the primary logical device to the shadow device is complete, the primary mirror shadowing system 400 mirrors primary logical device updates to the shadow device as the updates occur. The system switches designation of the secondary volume from the secondary logical device to the shadow device so that the request for pairing is completed 414 with full data on the secondary volume. If the copy is not complete, the primary mirror shadowing system 400 facilitates earlier completion of the pair create operation.

Figure 5:
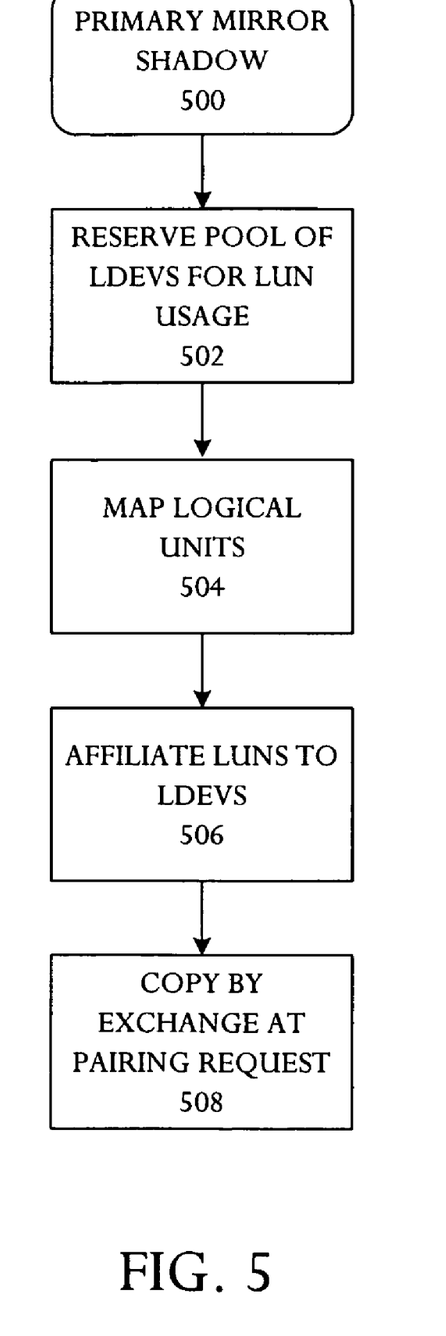
FIG. 5 is a schematic flow chart showing another embodiment of a primary mirror shadowing system.

Referring to FIG. 5, a flow chart depicts another embodiment of a primary mirror shadowing system 500. The primary mirror shadowing system 500 reserves a pool of logical devices 502 for usage as a secondary volume for subsequent pairing to a predefined primary volume. The primary mirror shadowing system 500 maps the logical units 504, for example by designating at least one secondary volume for subsequent usage as an internal copy primary volume, and associates logical devices to logical units 506. The primary mirror shadowing system 500 creates and emulates a shadow logical device, mirroring writes to the primary device to the shadow. In response to a pairing request 508, the primary mirror shadowing system 500 instantaneously evokes a volume copy by exchanging the association of logical devices to logical units.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed system specifically describes disk storage devices such as magnetic disks. In other embodiments, other types of storage technology may be used, for example tape storage.

What is claimed is:

1. A storage system with primary mirror shadow comprising:
    a storage array; and
    a controller capable of predefining storage array volumes as a primary volume that is subsequently paired with a secondary volume, emulating a primary logical device and a plurality of secondary logical devices including a shadow logical device, and instantaneously evoking a volume copy of the primary volume by switching a pointer from a secondary logical device of the secondary volume to the shadow logical device when a request is made to pair the primary volume with the secondary volume.

2. The storage system according to claim 1 wherein:
    the storage array is a disk array of a selected Redundant Array of inexpensive Disk (RAID) type and a disk array volume is defined in advance for usage as a copy primary volume for subsequent pairing with a secondary volume, also of the selected RAID type.

3. The storage system according to claim 1 wherein:
    at least one secondary volume is designated for subsequent usage as an internal copy of the primary volume and the controller creates and emulates the shadow logical device so that, in response to a request for a full copy of the primary volume to the secondary volume, the controller instantaneously switches volume and logical device pointers to enable usage of the shadow logical device as the secondary volume.

4. The storage system according to claim 1 wherein:
    the controller emulates the shadow logical devices as a reserved pool selected from among a group consisting of a pool of logical devices allocated for eventual usage as internal copy secondary volumes, a pool of logical devices allocated for eventual usage as external copy secondary volumes, a pool of generic logical devices allocated for assignment to a port path for detection by a host, and logical devices created from a pool of hot spare physical disks.

5. The storage system according to claim 1 wherein:
    the storage array is a disk array.

6. The storage system according to claim 1 wherein:
    the storage array is selected from among a group consisting of an internal disk array and an external disk array.

7. A storage system with primary mirror shadow comprising:
    a storage array; and
    a controller capable of reserving a pool of logical devices for usage as a secondary volume for subsequent pairing to a predefined primary volume, copying the primary volume to a shadow logical device before a pairing request is made, and instantaneously evoking a volume copy of the primary volume by switching a pointer from a secondary logical device of the secondary volume to the shadow logical device when the pairing request is made.

8. The storage system according to claim 7 wherein:
    the controller manages the pool of logical devices selected from among a group consisting of a pool of logical devices allocated for eventual usage as internal copy secondary volumes, a pool of logical devices allocated for eventual usage as external copy secondary volumes, a pool of generic logical devices allocated for assignment to a port path for detection by a host, and logical devices created from a pool of hot spare physical disks.

9. The storage system according to claim 7 wherein:
    the storage array is a disk array of a selected Redundant Array of Inexpensive Disk (RAID) type and a disk array volume is defined in advance for usage as a copy primary volume for subsequent pairing with a secondary volume, also of the selected RAID type.

10. The storage system according to claim 7 wherein:
    at least one secondary volume is designated for subsequent usage as an internal copy of the primary volume and the controller creates and emulates the shadow logical device so that, in response to a request for a full copy of the primary volume to the secondary volume, the controller instantaneously switches volume and logical device pointers to enable usage of the shadow logical device as the secondary volume.

11. The storage system according to claim 7 wherein:
    the storage array is a disk array.

12. The storage system according to claim 7 wherein:
    the storage array is selected from among a group consisting of an internal disk array and an external disk array.

13. A method of managing a storage array with primary mirror shadow comprising:
    defining storage array volumes prior to usage as a primary volume for subsequently pairing with a secondary volume;
    emulating a primary logical device and a plurality of secondary logical devices including a shadow logical device;
    copying the primary volume to the shadow logical device before a request is made to pair the primary volume with the secondary volume; and
    instantaneously evoking a volume copy of the primary volume by switching a pointer from a secondary logical device of the secondary volume to the shadow logical device when the request is made to pair the primary volume with the secondary volume.

14. The method according to claim 13 further comprising:
    defining a first logical unit as the primary volume in a pair to be subsequently established, the definition associating the first logical unit to the primary logical device;

leaving a second logical unit undesignated and unidentified as the secondary volume;

selecting a logical device as the shadow logical device; and initiating copying of the primary logical device to the shadow logical device.

15. The method according to claim 14 further comprising:

designating a second logical unit as an eventual secondary volume, the designation associating the second logical unit to the secondary logical device; and continuing copying of the primary logical device to the shadow logical device.

16. The method according to claim 15 further comprising:

receiving a request for pairing the primary volume and the secondary volume;

if a track ordered copy from the primary logical device to the shadow logical device is complete:

mirroring primary logical device updates to the shadow logical device as the updates occur; and switching designation of the secondary volume from the secondary logical device to the shadow logical device so that the request for pairing is completed with full data on the secondary volume.

17. The method according to claim 16 further comprising:

releasing the secondary logical device for subsequent usage.

18. The method according to claim 15 further comprising:

receiving a request for pairing the primary volume and the secondary volume;

if a track ordered copy from the primary logical device to the shadow logical device is not yet complete:

switching designation of the second logical unit from the secondary logical device to the shadow logical device so that the request for pairing can be completed sooner-than-otherwise before claiming done to a user.

19. The method according to claim 15 further comprising:

receiving a request for pairing the primary volume and the secondary volume;

if a track ordered copy from the primary logical device to the shadow logical device is not yet complete:

switching designation of the second logical unit from the secondary logical device to the shadow logical device so that the request for pairing can be completed with immediate claiming of done to a user and continuing background copying to complete the copy while supplying data to the user.

20. An article of manufacture comprising:

a controller usable medium having a computable readable program code embodied therein for managing a storage array with primary mirror shadow, the computable readable program code further comprising:

a code causing the controller to define storage array volumes prior to usage as a primary volume for subsequently pairing with a secondary volume;

code causing the controller to create a shadow logical device;

code causing the controller to copy the primary volume to the shadow logical device before a pairing request is made;

a code causing the controller to instantaneously evoke a volume copy of the primary volume by switching a pointer from a secondary logical device of the secondary volume to the shadow logical device when the pairing request is made.

21. A storage array with primary mirror shadow comprising:

means for defining storage array volumes prior to usage as a primary volume for subsequently pairing with a secondary volume;

means for emulating a primary logical device and a plurality of secondary logical devices including a shadow logical device;

means for copying the primary volume to the shadow logical device before a request is made to pair the primary volume with the secondary volume; and means for instantaneously evoking a volume copy of the primary volume by switching a pointer from a secondary logical device of the secondary volume to the shadow logical device when the request is made to pair the primary volume with the secondary volume.

22. A method of managing a storage array with primary mirror shadow comprising:

reserving a pool of logical devices for usage as a secondary volume for subsequent pairing to a predefined primary volume;

creating a shadow logical device;

copying the primary volume to the shadow logical device before a pairing request is made; and instantaneously evoking a volume copy of the primary volume by switching a pointer from a secondary logical device of the secondary volume to the shadow logical device when the pairing request is made.

23. The method according to claim 22 further comprising:

designating at least one secondary volume for subsequent usage as an internal copy primary volume.

24. The method according to claim 23 further comprising:

detecting a request for a full copy of the primary volume; and responding to the request comprising:

instantaneously switching volume and logical device pointers to enable usage of the shadow logical device as the secondary volume.

* * * * *

UNITED STATES PATENT AND TRADEMARK OFFICE
CERTIFICATE OF CORRECTION

PATENT NO. : 7,360,044 B2
APPLICATION NO. : 10/896100
DATED : April 15, 2008
INVENTOR(S) : Robert Cochran et al.

It is certified that error appears in the above-identified patent and that said Letters Patent is hereby corrected as shown below:

In column 7, line 45, in Claim 2, delete "inexpensive" and insert -- Inexpensive --, therefor.

Signed and Sealed this

Twenty-ninth Day of July, 2008

JON W. DUDAS
*Director of the United States Patent and Trademark Office*